US008644316B2

(12) United States Patent
Savoor et al.

(10) Patent No.: US 8,644,316 B2
(45) Date of Patent: Feb. 4, 2014

(54) IN-BAND MEDIA PERFORMANCE MONITORING

(75) Inventors: Raghvendra G. Savoor, Walnut Creek, CA (US); Zhi Li, San Ramon, CA (US); Steve Gemelos, Cupertino, CA (US); Ganesh Krishnamurthi, Danville, CA (US); Steve Sposato, Lafayette, CA (US)

(73) Assignee: Chanyu Holdings, LLC, Wilmington, DE (US)

( * ) Notice: Subject to any disclaimer, the term of this patent is extended or adjusted under 35 U.S.C. 154(b) by 593 days.

(21) Appl. No.: 12/760,759

(22) Filed: Apr. 15, 2010

(65) Prior Publication Data

US 2010/0322091 A1   Dec. 23, 2010

Related U.S. Application Data

(63) Continuation of application No. 11/522,275, filed on Sep. 15, 2006, now Pat. No. 7,729,381.

(51) Int. Cl.
*H04L 12/28* (2006.01)

(52) U.S. Cl.
USPC .......................................... 370/392; 370/389

(58) Field of Classification Search
None
See application file for complete search history.

(56) References Cited

U.S. PATENT DOCUMENTS

| 5,563,884 | A  |   | 10/1996 | Fimoff et al. |
| 6,148,005 | A  |   | 11/2000 | Paul et al. |
| 6,714,545 | B1 |   | 3/2004  | Hugenberg et al. |
| 6,904,054 | B1 |   | 6/2005  | Baum et al. |
| 6,963,612 | B2 |   | 11/2005 | Haddad |
| 7,499,469 | B2 |   | 3/2009  | Fu et al. |
| 2002/0007492 | A1 |   | 1/2002 | Smyth et al. |
| 2002/0071440 | A1 |   | 6/2002 | Cerami et al. |
| 2002/0103919 | A1 |   | 8/2002 | Hannaway |
| 2004/0073716 | A1 | * | 4/2004 | Boom et al. ................... 709/250 |
| 2005/0102371 | A1 | * | 5/2005 | Aksu ............................. 709/217 |
| 2005/0130645 | A1 |   | 6/2005 | Albert Dobson et al. |
| 2006/0109805 | A1 |   | 5/2006 | Malamal Vadakital et al. |
| 2006/0179154 | A1 | * | 8/2006 | Sitaraman et al. ............ 709/231 |
| 2006/0193597 | A1 | * | 8/2006 | Horii et al. ....................... 386/46 |
| 2006/0269162 | A1 | * | 11/2006 | Chen et al. .................... 382/286 |
| 2006/0291468 | A1 | * | 12/2006 | Bopardikar et al. .......... 370/392 |
| 2007/0153914 | A1 |   | 7/2007 | Hannuksela et al. |
| 2007/0297339 | A1 | * | 12/2007 | Taylor et al. .................. 370/248 |
| 2008/0002576 | A1 | * | 1/2008 | Bugenhagen et al. ........ 370/229 |
| 2011/0305431 | A1 | * | 12/2011 | Yahata et al. ................. 386/241 |
| 2012/0002951 | A1 | * | 1/2012 | Reisman ....................... 386/278 |

FOREIGN PATENT DOCUMENTS

| WO | 2006003852 | 1/2006 |
| WO | 2008034064 | 3/2008 |

OTHER PUBLICATIONS

International Search Report and Written Opinion in Application No. PCT/US2007/078501 dated Apr. 15, 2008, 11 pages.

(Continued)

*Primary Examiner* — Phirin Sam

(57) ABSTRACT

A method including receiving data packets encapsulating at least part of a media stream, extracting a decoder-ready packet from the data packets, processing the decoder-ready packet; and substantially synchronously with the processing of the decoder-ready packet, generating delivery performance information for the at least part of the media stream, data from which is included in the decoder-ready packet.

20 Claims, 10 Drawing Sheets

(56) References Cited

OTHER PUBLICATIONS

Tektronix, A Guide to Maintaining Video Quality of Service for Digital Television Programs, http://www.tektronix.com/Measurement/App.sub.--Notes/Technical.sub.--Brie- fs/digital.sub.--QoS/25W.sub.--14000.sub.--1.pdf, (2001), 26 pages.
An Overview of MPEG-2, http://home.pacbell.net/ray2288/technicb.html, (Dec. 10, 1999), 8 pages. [Retrieved Jun. 7, 2006].
A Beginners Guide for MPEG 2 Standard, http://www.fh-friedberg.de/fachbereiche/e2/telekom-labor/zinke/mk/mpeg2be- g/beginnzi.htm, 14 pages. [Retrieved Jun. 6, 2006].
Brix Networks—VoIP—VoIP Testing, VoIP Performance Management and VoIP Service Assurance, http://www.brixnet.com/, 2 pages. [Retrieved Jun. 6, 2006].
Brix Networks—VoIP—VoIP Testing, VoIP Performance Management and VoIP Service Assurance, Brix NetworksLibary http://www.brixnet.com/library/library_register.aspx, 3 pages. [Retrieved Jun. 6, 2006].
Broadcast industry whitepapers—broadcastpapers.com, http://www.broadcastpapers.com/whitepapers.cfm?objid=2, 4 pages. [Retrieved Jun. 9, 2006].
H.264/MPEG-4 AVC, Wikipedia, the free encyclopedia, http://en.wikipedia.org/wiki/H.264/MPEG-4_AVC, 11 pages. [Retrieved Jun. 6, 2006].
Ineoquest Application Notes, IPTV and VoIP Resources, http://www.ineoquest.com/page240.html, 2006, 5 pages. [Retrieved Jun. 6, 2006].
Introduction to MPEG 2 Video Compression, http://www.zenith.com/sub_hdtv/mpeg_tutorial/mpeg2vc1.HTM, 2 pages. [Retrieved Jun. 7, 2006].
IPTV, Wikipedia, the free encyclopedia, http://en.wikipedia.org/wiki/IPTV, 3 pages. [Retrieved Jun. 6, 2006].
InTellon: No New Wires, IPTV—Distribution in Home Networks, 26002870 Revision 1, 2005, pp. 1-12.
MPEG-2, Wikipedia, the free encyclopedia, http://en.wikipedia.org/wiki/MPEG-2, 9 pages. [Retrieved Jun. 6, 2006].
MPEG-2 Encoders and Decoders, http://erg.abdn.ac.uk/research/future-net/digital-video/mpeg2-dec.html, 5 pages. [Retrieved Jun. 7, 2006].
NeST Multimedia Capability: Multimedia and Streaming, www.nestsoftware.com/Write-ups/Multimedia_streaminq.pdf, (Observed Jun. 7, 2006), 2 pages.
IneoQuest Technologies, Inc.—The Video over IP Quality Specialists, Next Generation Measurements for Next Generation Networks, http://www.ineoquest.com/,2 pages. [Retrieved Jun. 6, 2006].
Quality of Service, Wikipedia, the free encyclopedia, http://en.wikipedia.orq/wiki/Quality_of_Service, 4 pages. [Retrieved Jun. 6, 2006].
Michael Adams, et al., "Quality Video over IP Networks: Achieving High-Quality IPTV Services with Payload-Aware Network Devices," Terayon White Paper, 2005, 9 pages.
Gorry Fairhurst, "Re: IP -> PES -> MPEG TS?," http://www.erg.abdn.ac.uktipdvb/archive/0203/msg00018.html, Mar. 25, 2002,3 pages. [Retrieved Jun. 7, 2006].
Real-time Transport Protocol, Wikipedia, the free encyclopedia, http://en.wikipedia.orq/wiki/Real-time_Transport_Protocol,3 pages. [Retrieved Jun. 6, 2006].
Triple Play, Wikipedia, the free encyclopedia, http://en.wikipedia.org/wiki/Triple._play_%28telecommunication- s%29, 2 pages. [Retrieved Jun. 6, 2006].
Very-high-bit-rate Digital Subscriber Line, Wikipedia, the free encyclopedia, http://en.wikipedia.org/wiki/VDSL,3 pages. [Retrieved Jun. 6, 2006].
"Video Quality Measurement Algorithms: Scaling IP Video Services for the Real World", A White Paper, Brix Networks, 2006, 7 pages.
Nate Anderson, "An introduction to IPTV," arstechnica, Mar. 12, 2006, http://arstechnica.com/guides/other/iptv.ars, 4 pages.
P.P Gandhi, "Digital Cable: Video Over IP," Communications Technology—Archives, Feb. 2002, http://www.ct-magazine.com/archives/ct/0202/0202voip.htm ,5 pages.
Steven Hawley, Table of Contents—An In-Depth Introduction to Internet Protocol Television (IPTV), Tracy Swedlow's itvt, Jul. 2004, 2 pages.
Hoffman, et al., "RTP Payload Format for MPEG1/MPEG2 Video," Network Working Group, Standards Track, Jan. 1998, http://www.ietf.org/rfc/rfc2250.txt, 15 pages. [Retrieved Jun. 7, 2006].
IneoQuest Technical Bulletin, Characterizing and Troubleshooting FEC Protected Links Using the Singulus G1-T, Sep. 17, 2004 2 pages.
IneoQuest—Video Over IP Quality Specialists, "Media Delivery Index," 5 pages.
IneoQuest—Video Over IP Quality Specialists, "Monitoring IPTV for Service Providers—Five Reasons to Monitor IPTV," http://ftp.ineoquest.com/pub/docs/Papers/5_Reasons_for_Monitoring_IPTV_060105.pdf, 3 pages.
Chiquoine, et al., "PCR and MDI Measurements for VoD Applications", Ineoquest Technical Brief, http://ftp.ineoquest.com/pub/docs/Papers/PCR_and_MDI_measurements_for_VOD_applications.pdf, 6 pages.
IneoQuest—Video Over IP Quality Specialists, "MDI/QoE for IPTV and VoIP—Quality of Experience for Media over IP," http://ftp.ineoquest.com/pub/docs/Papers/MediaQualityofExperience_0-60105.pdf, 5 pages.
IneoQuest—Video Over IP Quality Specialists, "Testing and Qualifying IPTV Networks for Streaming Media Applications," IneoQuest Technologies Article, Aug. 12, 2005, 11 pages.
IneoQuest, "Troubleshooting Both Network IP and MPEG for Video on Demand," IQ Application Note, http://ftp.ineoquest.com/pub/docs/Papers/troubleshootinqIPandMPEG_final.PDF,15 pages.
InTellon: No New Wires, "IPTV—Distribution in Home Networks," 26002870 Revision 1, 2005, 12 pages.
J. Lee, "HDVTS:HDV Transmission System," www.apan.net/meetings/cairns2004/presentation/hdtv-jblee.ppt, (Jul. 6, 2004), 10 pages.
J. Lee, "High-Definition Digital Video (HDV) Over Internet: System Design, Experiments and Applications <Draft-Mar. 30, 2005>," http://cosmos.kaist.ac.kr/hdtv/hdv/tm.pdf, (2005), 4 pages.
Bruce Stewart, "An Introduction to IPTV," Technical, Mar. 14, 2006, http://www.oreillynet.com/etel/blog/2006/03/an_introduction_to_iptv.html, 2 pages.
Marc Todd, "Quality of Video-over-IP Measuring the Quality of Streaming MPEG-2 Transport Streams over IP," IneoQuest Technologies, Inc., http://ftp.neoquest.com/pub/docs/Papers/VideoOverIPStreamQuality.pdf, 9 pages.
P. N. Tudor, "Introduction to MPEG-2 Video compression," Electronics and Communication Engineering Journal, Dec. 1995,13 pages.

* cited by examiner

IN-BAND MEDIA PERFORMANCE MONITORING

CROSS-REFERENCE TO RELATED APPLICATIONS

This application is a continuation of U.S. patent application Ser. No. 11/522,275 filed Sep. 15, 2006 by Savoor et al. now U.S. Pat. No. 7,729,381, entitled "IN-BAND MEDIA PERFORMANCE MONITORING", which is incorporated herein by reference in its entirety.

TECHNICAL FIELD

The present disclosure relates to the delivery of video via a packetbased network (e.g.; the Internet), and specifically to the monitoring of performance quality for video and other media delivered over a network (e.g., a VDSL network).

BACKGROUND

Telecommunications providers and others are in the process of deploying wide-scale 'triple-play' networks to provide subscribers with Internet communications, streaming video, and streaming audio—including voice communications in a single subscription service. Many of these triple-play networks use the Internet Protocol (IP) to deliver video services, and since in some cases communications bandwidth to individual subscriber's homes is implemented using very high bit-rate DSL (VDSL), it is useful to monitor subscriber's IP video service quality to, among other things, quickly detect network problems and perform trouble-shooting of the network and video delivery mechanisms.

Video may be delivered over these networks using the real-time protocol (RTP). This protocol breaks up a media stream, such as, for example, an MPEG-2 video stream, into a series of separate packets that are then routed through a network to a subscriber's IP video receiver. Because the RTP packets are not transmitted synchronously, but rather are routed individually through the network, certain packets may be lost, delayed, delivered out of sequence, become corrupted, or suffer other mishaps. While these kinds of mishaps can occur in other applications, such as e-mail communication, they are particularly noticeable in the delivery of video and audio streams. There are further technical challenges to the delivery of such streamed information in view of the large amount of information that is contained in the video stream and that must be assembled very quickly and reliably into a video presentation by the IP video receiver. Accordingly, even very limited amounts of defective or late routing of relatively few RTP packets may cause a noticeable and annoying degradation of video quality from the point of view of the user.

There exists tools that can be included in video receiving equipment that can monitor the video path delivery performance and detect the various problems that may affect packet delivery such as loss, delay, disordering, and the like. However, these tools capture information in terms of RTP packet delivery, rather than in terms of the actual video quality as presented by the IP video receiver. While sometimes useful as a rough approximation of video delivery quality, these tools do not take into account the fact that IP video receiving equipment usually buffers a significant number of RTP packets in memory, providing a window of opportunity for late or out of order RTP packets to arrive before the video content they contain must be decoded and presented as video. In addition, many IP video receivers include packet loss recovery mechanisms, whereby missing RTP packets can be requested and, hopefully, received during the interval between the time the missing packet should have been received and the time that it would need to be available for decoding into video. Finally, the amount of video impairment caused by the loss, delay, disordering, corruption, etc of RTP packets is not uniform, but may depend on the content of the packet. For example, a packet containing important video control information or parts of important "I" MPEG frames, if despite efforts at error recovery, is not available in time for its video decoding, will cause a comparatively more severe disruption in video quality than the loss of a packet containing only a small part of a less significant "P" MPEG frame. It is these kinds of subtleties of delivery quality in terms of the video presented by the IP video receiver that tools, which track only the video path performance at the level of RTP packet delivery, are unable to detect. Moreover, some of these tools are designed to be installed at the video head-end or video server and thus may not scale up to the large number of subscribers envisioned for triple-play networks.

A technique that can be used to monitor the quality of video as ultimately presented to the user involves capturing the actual video stream as presented by the user (after buffering, packet loss recovery, decoding, etc) and transmitting it back upstream to the sender of the video (e.g., a multicast or unicast video server) or some other video quality monitoring tool. In this way, the video as ultimately presented by the IP video receiver can be compared directly with the video as transmitted to the IP video receiver by the transmitter. However, this technique usually cannot be implemented successfully because VDSL usually has limited upstream bandwidth, this limited bandwidth not being sufficient to transmit back the actual video stream as presented to the user.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

System Overview

Figure 1:
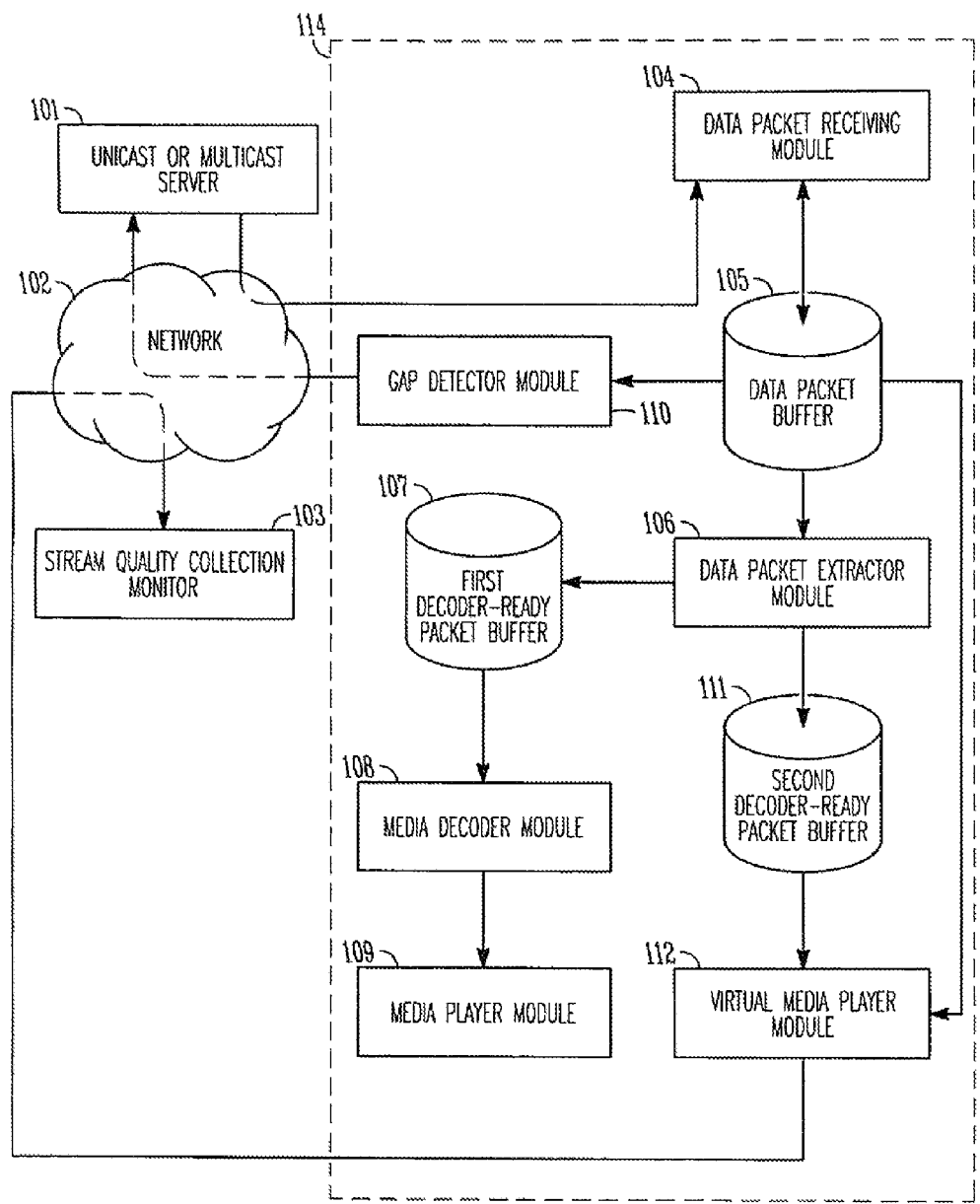
FIG. 1 shows a system diagram of an IF video receiver having separate decoder-ready packet buffers for the video decoder module and a virtual media player module, according to an example embodiment.

FIG. 1 illustrates a system for receiving and presenting IP media content, such as, for example, IP video content via set-top box (STB), according to an example embodiment. In this system, a number of modules are shown as well as data buffers and other components. In some embodiments, the modules and other components contained within the dashed rectangle 114 may be contained within a set-top box (STB) or other IP media receiver. In other embodiments, one or more of the modules and components shown within the rectangle 114 may be separate physical components operatively connected to an IP media receiver. It will be appreciated that numerous other embodiments are possible.

Media delivery, such as video delivery, may begin with the transmission of a media (e.g. video, audio, MPEG-2, MPEG-2 with audio, MPEG-4, etc) stream by a unicast or multicast video server 101. The data packets transmitted from this server 101 pass through a network (such as, for example, the Internet, or a combination of fibre optic and VDSL) 102. The data packets, in the case of MPEG video and/or audio, may be encoded in the real-time protocol (RTP). After traversing the network 102, the packets may arrive at the IP media receiver where they may be received by a data packet receiving module 104. The data packet receiving module 104 may store the received data packets, such as RTP packets, in a data packet buffer 105; in some embodiments, the data packet receiving module 104 may be implemented as two separate processes, one interacting with the video server 101 over with the other managing the data packet buffer 105.

In some embodiments, a separate data packet extractor module 106 is responsible for extracting decoder-ready packets from the data packet buffer 105. The decoder-ready packet extractor module 106 may attempt to extract MPEG transport stream (TS) packets from the RTP packets stored in the buffer 105, and then assemble packetized element stream (PES) packets suitable for presentation to an MPEG video decoder from one or more TS packets. In other embodiments, PES packets may be directly extractable from RTP packets, without being intermediately encapsulated within TS packets. In an embodiment where an MPEG stream is encapsulated within the RTP packets received by the data packet receiving module 104, the decoder-ready packets may thus include PES packets. The data packet extractor module 106 may store the decoder-ready packets into two decoder-ready packet buffers 107 and 111, with all the decoder-ready packets being placed into each of the buffers 107 and 111. A media decoder module 108 may retrieve the decoder-ready packets from the buffer 107, decode them into frames or other data structures and present these frames to a media player module 109 for presentation to a user or other video presentation or storage. In some embodiments, the decoder ready packets include a decoding time stamp that can be used by the media decoder module 108 to determine when the decoder-ready packet should be processed. The decoder ready packets may also include a presentation time stamp that indicates to the media decoder module 108 and the media player module 109 when the content of the decoder-ready packet (e.g., a video frame) should be presented to the user within the context of playing the media.

In addition to the media decoder module 108, a virtual media player module 112 may be included in the system of FIG. 1. The virtual media player module 112 may run synchronously with the media decoder module 108, extracting the identical decoder-ready packets from the buffer 111 that the media decoder module 108 is extracting from the buffer 107. In some embodiments, these two modules may be synchronized based on the decoding time stamps of the decoder ready packets. To this end, the media player module 109 may be coupled, via a synchronisation module (not shown), to the virtual media player module 112. The synchronisation module may operate to synchronize the extraction of packets from the respective buffers 107 and 111 by the media player module 109 and the virtual media player module 112.

The virtual media player module 112 (which may be a virtual video player) may operate as follows to generate delivery performance information which may include media impairment information and/or reports: after extracting one or more decoder-ready packets from its buffer 111, the player module 112 may examine the packet content to determine the quality of the media being presented based on those same decoder-ready packets by the media decoder module 108 and media player module 109. For example, if the virtual media player module 112 is a virtual video player suited to processing MPEG video streams, it may retrieve a number of PES packets from the buffer 111 and based on the content of the PES packets, determine if there has been unrecovered MPEG block loss, MPEG frame packet header loss, loss of an entire frame, missing RTP packets, or other mishaps. This may be done by checking the PES packets' header information.

Thus the virtual media player module 112 may generate and transmit in real-time a summary or report on what errors or mishaps have occurred (despite buffering of RTP packets, attempts at packet loss recovery, and the like) and may transmit a summary of the video packet (or frame) delivery performance (or impairment) information to a stream quality collection monitor 103. The stream quality collection monitor 103 may be located at the video provider's central office or other location where the video provider can observe or record the video performance of subscribers. This report may be presented in a very compact form, such as a list of missing RTP sequence numbers, a list of missing MPEG blocks by frame and location within frame, or similar compact data formats.

Considering further an embodiment of virtual media player module 112 as applied to the collection of MPEG video quality information, the following categories of video delivery performance information may be collected:

RTP packet loss information—the unavailable RTP packet sequence numbers at the scheduled decoding time of each RTP packet.

Video impairment information—may include the number of I, P, and B mpeg block loss and loss distribution, number of MPEG picture_header loss and loss distribution, synchronization between video and audio streams etc.

Network delivery path performance for each subscriber, such as RTP packet loss rate, jitter, RTP packet loss distance, and RTP packet loss period.

It will be appreciated that this information may be generated by the virtual media player module 112, in some embodiments, by attempting to decode and assemble the media stream, and in some other embodiments by examining decoder-ready packets or the decoder-ready packet header information without attempting to decode or assemble the media stream.

The virtual media player module 112 can collect or generate and transmit media delivery performance information either while a user is actually watching and/or listening to a media stream, or when the IP media receiver (e.g., a IP video receiver, set-top box) is in a hibernation state, such as when it is receiving a media stream but not actively presenting it to the user. In either of these states, since a virtual media player module 112 within the IP media receiver may examine only the decoder-ready packet headers (e.g. PES packet headers), without performing the full media decoding process (including such operations as inverse discrete cosine transformations or inverse quantization), the operation of the virtual media player module 112 may not consume as much processor time in embodiments (e.g., in which the virtual media player module 112 shares a processor with other modules or processes in an IP media receiver, such as a media decoder module 108 or a media player module 109, such as, for example, within an IP video receiver or set-top box (STB)). Thus, the operation of a virtual video player module 112 does not materially affect the IP media receiver's performance, even in embodiments in which the virtual media player module 112 shares a processor with other modules and operations within the IP media receiver. This may, for example, be beneficial in the case of an IP video receiver that includes video decoding and/or playing modules or functions as a "system on a chip" able to operate largely independently of the main processor(s) of the IP video receiver.

Although this specification has described the IP media receiver in some embodiments as a set-top box (STB), which in some embodiments may be used to receive IPTV, or as a IP video receiver, it will be appreciated that this device may in some embodiments be a personal computer, a portable computer, a cell phone, a personal digital assistant (PDA), an internet radio, a telephone, a video telephone, or many other devices capable of receiving and/or presenting a media stream to a user. Although this specification has described embodiments with respect to video streams and MPEG streams in particular, it will be understood that embodiments for in-band monitoring the performance of other media delivery performance are possible, including audio, including audio MPEG streams, voice communications, and combined MPEG audio/video streams, as well as other IP delivered media formats.

In some embodiments, there may exist a packet loss recovery mechanism, such as the gap detector module 110. Some types of decoder-ready packets may include information indicating which data packet or packets they were extracted from. For example, PES packets used by MPEG video and/or audio include RTP sequence numbers. The gap detector module 110, may in some embodiments examine the decoder-ready packets in buffers 107 or 111, in some embodiments by observing their decoding timestamps. If, as the system clock time approaches the decoding timestamp associated with a decoder-ready packet after which there are one or more missing or incomplete decoder-ready packets, the gap detector module 110 may send a message to a video server 101 to resend the data packets needed to fill in the missing or incomplete decoder-ready packets by the action of the data packet receiving module 104 and data packet extractor module 106. An example embodiment of the process carried out by a gap detector module 110 is presented below.

Figure 2:
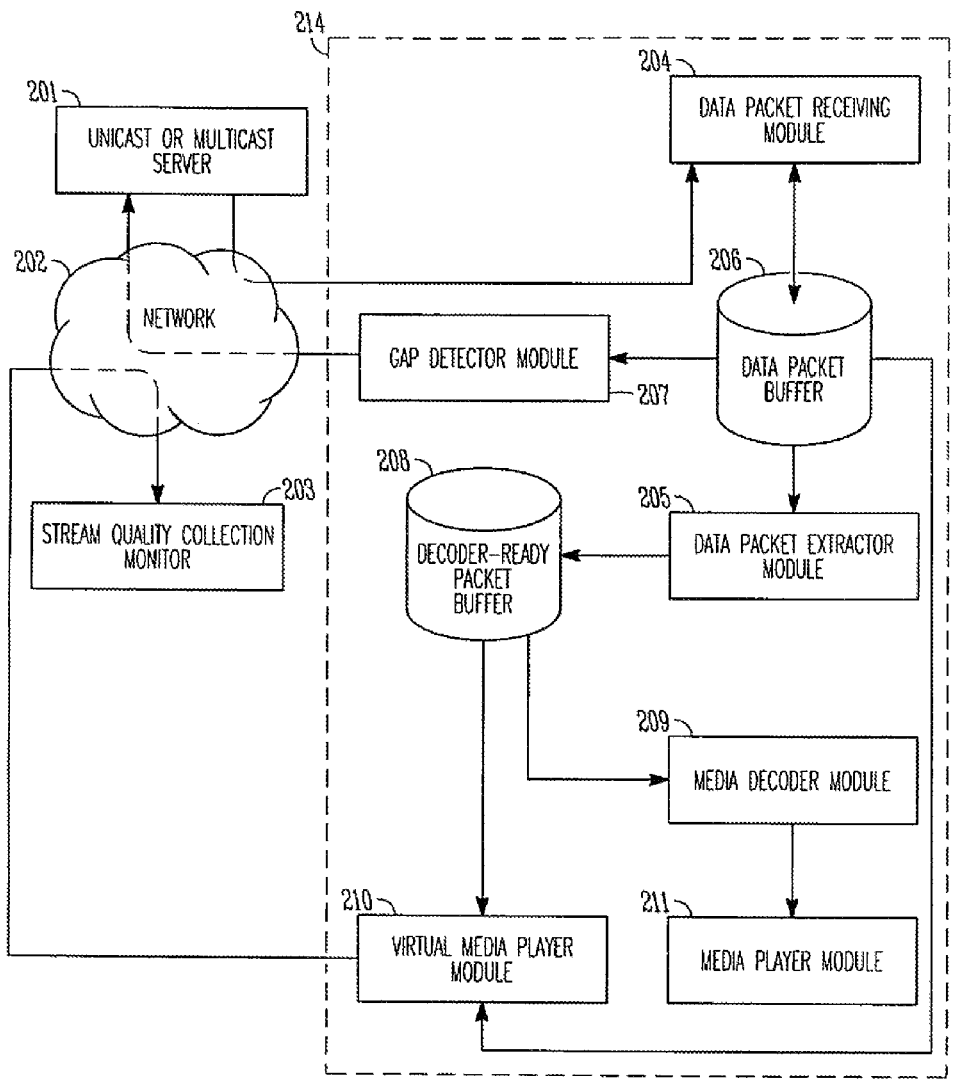
FIG. 2 shows a system diagram of an IF video receiver having a shared decoder-ready packet buffer, according to an example embodiment.

In some embodiments, a stream quality collection monitor (SQCM, at 103; 203 in FIG. 2) may be included in the system to collect the media performance information collected and complied by the virtual media player module (112; 210 in FIG. 2). For example, in the case in which an IP video receiver is receiving a MPEG video in a stream encapsulated by data packets such as, for example, RTP packets, the stream quality collection monitor 103 may be a video quality collection monitor. A stream quality collection monitor 103 may, in some embodiments, co-exist with or be integrated into the video server 101, or in other embodiments may be located in association with other servers able to receive (in an accurate and essentially unimpaired transmission) a copy of a media stream being transmitted to a subscriber.

In some embodiments, a stream quality collection monitor 103 may include a mechanism for mapping an RTP packet loss report from a subscriber's IP video receiver to the actual RTP packets transmitted from the video server 101. In some embodiments, the service quality collection monitor 103 may, when necessary, replay the video frames actually received by the subscriber's IP video receiver and carry out monitoring and performance analysis using objective or subjective techniques in comparison with the unimpaired media stream transmitted from the video server 101. In some embodiments, the stream quality collection monitor 103 may correlate the results of this performance analysis with the video delivery performance information collected and transmitted by the virtual media player module 112 and thereby obtain empirical data on the media path delivery performance. In some embodiments, the service quality collection monitor 103 may, based on this empirical data, map the subscribers' video delivery performance information (as transmitted by the virtual media player module 112) to video objective performance information and thereby monitor the real-time video performance that a subscriber's IP video receiver is able to achieve.

As indicated above, a stream quality collection monitor 103 may, in some embodiments, co-exist with or be integrated into the video server 101, or in other embodiments may be located in association with other servers. In addition, a technician who may visit a customer site, may be provided by a service provider with a portable stream quality collection monitor that may be attached or connected to the customer's set-top box for troubleshooting during site visits.

In any of these embodiments of the stream quality collection monitor 103, the SQCM may include a user interface to show the various measurements of quality, such as data packet loss count relative to a data packet loss acceptability threshold, and in the case of MPEG video streams, a display of the number and type of MPEG block loss, picture_header loss, video and audio asynchrony events, as well as packet loss, jitter, and other forms of media impairment and delivery performance metrics. The user interface may in some embodiments display these metrics in comparison with the acceptability thresholds for these impairment. In some embodiments, these statistics may be shown on the user interface only when they exceed acceptability thresholds. Further, in some embodiments, the user interface may include an alarm, such as an audio alarm, to alert personnel at a media server facility to an over-threshold or unacceptably high level of media impairment, data packet loss, or the like, and to indicate the need for corrective action. In addition, in some embodiments, the user interface may include an ability for the user to select the viewing of video impairment, delivery performance, or video presentation quality information in real time, or as a time-series type of view over a period of time. Finally, the user interface may include affordances to allow a subjective comparison of video quality as it was delivered to the customer with the video quality as transmitted from the video server, such as displaying the two video streams in separate onscreen windows.

FIG. 2 illustrates a system for receiving and presenting IP delivered video content, such as, for example, by a set-top box (STB), according to an example embodiment. In FIG. 2 it will be apparent that, as compared to FIG. 1, both the media decoder module 209 and the virtual media player module 210 retrieve decoder-ready packets (such as, for example, PES packets) from a single decoder-ready packet buffer 208, rather than from separate buffers. It will be appreciated that a simple scheme may be implemented to be sure that a particular decoder-ready packet is not deleted from this buffer 208 until both the media decoder module 209 and the virtual media player module 210 have retrieved that particular packet. In some embodiments, most or all of the modules may be contained in an IP media player such as, for example, a set-top box; this containment is indicated (analogously to that of FIG. 1) by the dashed rectangle 214. In other embodiments, some of the components or modules of FIG. 2 may be separate from a set-top box or other IP media receiver and operatively connected thereto.

Example Embodiments of Processing within Modules

FIGS. 3-12 illustrate, according to example embodiments, summary flow charts of processes that may be carried out by the data packet receiving, data packet extractor, gap detector, and virtual media player modules, respectively, as they may be implemented according to an embodiment capable of processing MPEG video.

Figure 3:
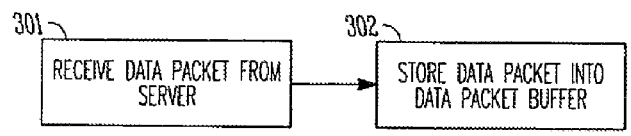
FIG. 3 shows a summary flow chart for the operation of a data packet receiving module, according to an example embodiment.

FIG. 3 illustrates a summary flow chart for the operation of a data packet receiving module 104, according to an example embodiment. At 301, a data packet receiving module 104 receives a data packet as part of a media stream, such as, for example, an RTP packet that encapsulates part of an MPEG video and/or audio stream, from a unicast or multicast media (e.g. video) server 101. At 302, the data packet receiving module 104 stores the data packet into a data packet buffer 105. These operations may be repeated for as many data packets are needed to fully encapsulate the media stream.

Since data packets (e.g., RTP packets) may not be received by the data packet receiving module 104 in the same order they were transmitted from the unicast or multicast server 101, due to network latency, jitter and other effects, the data packet receiving module 104 may include procedures to keep the data packets stored in the data packet buffer 105 ordered according to their decoding time stamps.

Figure 4:
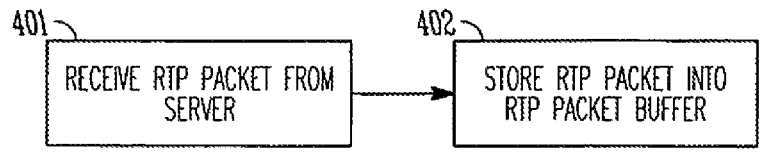
FIG. 4 shows a summary flow chart for the operation of a data packet receiving module, such as for receiving RTP packets, according to an example embodiment.

FIG. 4 illustrates a summary flow chart for the operation of a data packet receiving module 104, in particular a data packet receiving module 104 able to receive data packets which are RTP packets, according to an example embodiment. At 401, a data packet receiving module 104 receives a data packet as part of a media stream such as an RTP packet that encapsulates part of an MPEG video and/or audio stream, from a unicast or multicast media (e.g. video) server 101. At 402, the data packet receiving module 104 stores the RTP packet into a data packet buffer 105, which in the case of receiving an MPEG video stream may be an RTP packet buffer. These operations may be repeated for as many RTP packets are needed to fully encapsulate the MPEG stream.

Figure 5:
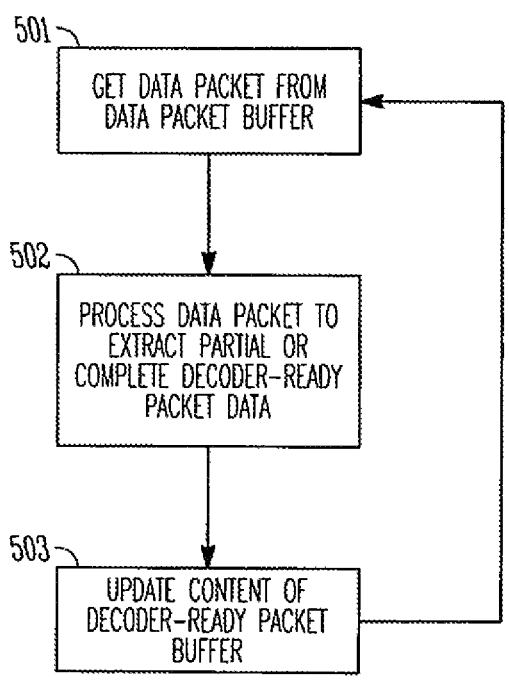
FIG. 5 shows a summary flow chart for the operation of a data packet extractor module, according to an example embodiment.

FIG. 5 shows a summary flow chart for the operation of a data packet extractor module 106, according to an example embodiment. At 501, the data packet extractor module 106 extracts a data packet (such as, for example, an RTP packet encapsulating a portion of an MPEG video stream) from the data packet buffer 105 and may prepare it for further processing. At 502, the packet extractor module 106 processes the data packet to extract partial or complete decoder-ready packet data, which may be used to store decoder-ready packets into decoder ready packet buffers 107 or 111, or to complete partial decoder-ready packets stored in those buffers, or locally by the data packet extractor module 106. For example, in some embodiments, the processing at 502 may include extracting transport stream (TS) packets from an RTP packet, and further processing the TS packets, which in the case of MPEG video may contain parts of one or more packetized element stream (PES) packets serving as decoder-ready packets. At 503, the data packet extractor module 106 may update the content of the decoder-ready packet buffers 107 and 111 by, for example, adding new complete packets extracted from the data packet. The updating 503 may also include storing newly completed decoder-ready packets (e.g. newly completed by data extracted from the data packet) or replacing partial decoder-ready packets in the buffers 107 and 111, by more complete decoder-ready packets based on the data extracted from the data packet. Once the updating process 503 is completed, processing may return to continue at 501. Partial decoder-ready packets may in some embodiments be stored locally by the data packet extractor module 106 or stored into the buffers 107 and 111, as described below.

The first decoder-ready packet buffer 107 and the second decoder ready packet buffer 111 may, in some embodiments, store the decoder-ready packets in decoding timestamp order and may be structured so that packets and other data stored in them can be inserted and deleted easily and without affecting the buffers' ordering. This ordered storing and structure maintenance may in some embodiments, be carried out by functions of the data packet extractor module 106.

In some embodiments, the data packets, for example, RTP packets, include a decoding time stamp of their own, indicating when the data packet extractor module 106 should extract decoder-ready packets from the data packets; in those embodiments, the extraction process described above may be done according to the data packets' decoding time stamps. In other embodiments, decoding time stamps associated with the data packets may be absent or ignored. In these embodiments, attempting to extract decoder-ready packets from data packets may be done immediately upon reception of data packets by the data packet receiving module 104.

It may be the case that one or more data packets, such as RTP packets may be lost or otherwise unavailable at the time that it is necessary that the decoder-ready packets they encapsulate are needed, resulting in the absence of one or more complete decoder-ready packet available to the media decoder module 108. In some embodiments, the data packet extractor module 106 may store partial decoder-ready packets (such as partial PES packets) in the hopes of receiving enough data encapsulated in one or more later-received data packets to complete the partial PES packet so that it can be stored into the buffers 107 and 111. This mechanism may be appropriate when the particular media decoder module 108 can correctly process only complete decoder-ready packets. In some other embodiments, the packet extractor module 106 may store incomplete decoder-ready packets into the buffers 107 and 111, if the media decoder module 108 is implemented to be able to process such partial decoder-ready packets. This latter embodiment may be appropriate where the media decoder module is able to construct, for example, an MPEG video frame where much of the frame could be approximated based on other complete frames, with a few blocks within the frame recovered from an otherwise partial or defective PES packet. In embodiments where partial decoder-ready packets are stored in the buffers 107 and 111, the data packet extractor module 106 may replace the partial decoder-ready packets with more complete ones based on data from later-received data packets.

Figure 6:
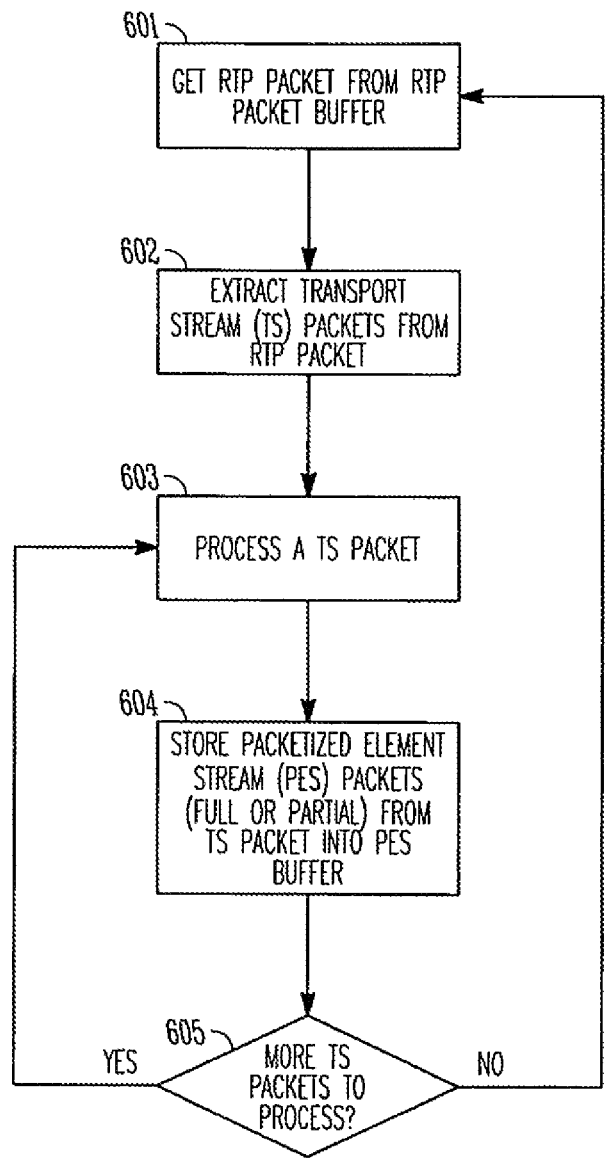
FIG. 6 shows a summary flow chart for the operation of a data packet extractor module, such as for extracting PES packets from RTP packets, according to an example embodiment.

FIG. 6 shows a summary flow chart for the operation of a data packet extractor module 106, as it may be adapted to the extraction of decoder-ready packets embodied as PES packets from data packets embodied as RTP packets, according to an example embodiment. At 601, the data packet extractor module 106 extracts an RTP packet (such as an example one encapsulating a portion of an MPEG video stream) from the data packet buffer 105 and may prepare it for further processing. At 602, the packet extractor module 106 extracts transport stream (TS) packets from the RTP packet. At 603, the packet extractor module 106 processes one of the TS packets, which in the case of MPEG video may contain parts of one or more packetized element stream (PES) packets. At 604, the packet extractor module 106 stores PES packets extracted from the TS packet into decoder-ready packet buffers 107 and 111, which in the case of an MPEG steam, are PES buffers. Partial PES packets may in some embodiments be stored locally by the data packet extractor module 106 or stored into the buffers 107 and 111, as described below. At 605, the packet extractor module 106 checks to see if the current RTP packet contains any more TS packets. If so, the next TS packet is processed at 603, and if not, processing continues to the next RTP packet at 601. When all the TS packets extracted from an RTP packet, any remaining partial PES packets may be stored into the PES buffers (e.g., 107 and 111) to await completion; the remaining portions of incomplete PES packets may be encapsulated in RTP packets not yet processed by the packet extractor module 106

The first decoder-ready packet buffer 107 and the second decoder ready packet buffer 111 may, in some embodiments, store the decoder-ready packets in decoding timestamp order and may be structured so that packets and other data stored in hem can be inserted and deleted easily and without affecting the buffers' ordering. This ordered storing and structure maintenance may in some embodiments, be carried out by functions of the data packet extractor module 106.

In some embodiments, decoder-ready packets, such as PES packets, may be directly encapsulated into data packets, such as RTP packets without any intermediate layer, such as TS packets.

Figure 7:
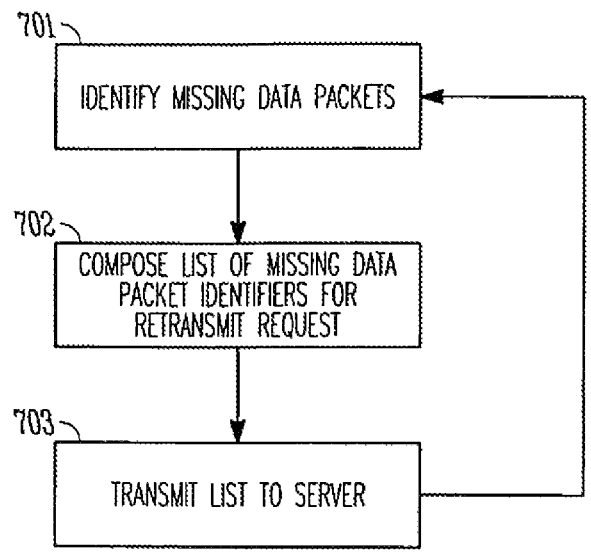
FIG. 7 shows a summary flow chart for the operation of a gap detector module, according to an example embodiment.

FIG. 7 shows a summary flow chart for the operation of a gap detector module 110, according to an example embodiment. In some embodiments, a gap detector module 110 may be used to determine whether there are gaps in the data packet buffer 105, which in the case of MPEG video may include gaps caused by missing or lost RTP packets. At 701, the gap detector module 110 may examine the contents of the data packet buffer 105 to identify missing data packets. This identification may be made by examining sequenced identification numbers of the data packets and detecting any gaps in the sequence numbers. At 702, the gap detector module 110 may compose a list of data packet identifiers (such as, for example, RTP packet sequence numbers) for retransmission request to the server 101. For example, it may be appropriate to transmit a retransmission request for missing data packets if it can be determined that the missing data packets would need to be processed soon but still far enough ahead in time that the latency of a retransmission request and subsequent retransmission by the server 101 could occur. Once the gap detector module 110 has determined which missing data packets truly merit being requested to be retransmitted, the request for retransmission of the missing data packets by suitable identifiers may be transmitted to the server 101 at 703. The gap detector module 110 may then repeat this cycle of processing recommencing at 701

Figure 8:
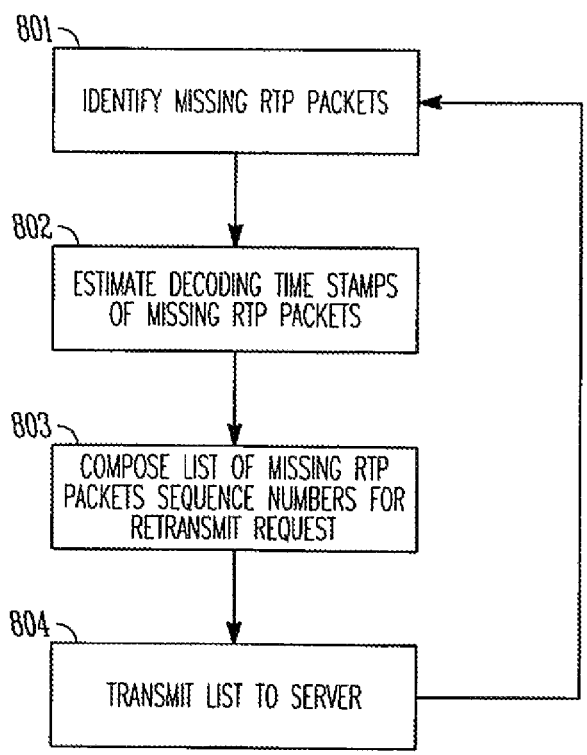
FIG. 8 shows a summary flow chart for the operation of a gap detector module, such as for detecting gaps in an RTP packet stream, according to an example embodiment.

FIG. 8 shows a summary flow chart for the operation of a gap detector module 110 by which gaps in a stream data packets embodied as RTP packets may be detected, according to an example embodiment. In some embodiments, a gap detector module 110 may be used to determine whether there are gaps in the data packet buffer 105, which in the case of MPEG video may include gaps caused by missing or lost RTP packets. At 801, the gap detector module 110 may examine the contents of the data packet buffer 105 to identify missing RTP packets. This identification may be made by examining the sequence numbers of the RTP packets and detecting any gaps in the sequence numbers. At 802, the gap detector module 110 may estimate the decoding time stamps of the missing RTP packets. This estimation may be done by interpolating the decoding time stamps of missing data packets based on the decoding time stamps of the nearest (in terms of sequence number) received data packets on either side of the missing data packet. At 803, the gap detector module 110 may compose a list of missing RTP packet sequence numbers for which retransmission from the server 101 is appropriate, in the sense of not being either too late or premature. For example, if the estimated decoding time stamp of a missing RTP packet is so close to the current system clock time that it is too late for a request for its retransmission to be transmitted, processed, and another copy of the missing RTP packet to be retransmitted, it would be inappropriate to transmit a request to retransmit that RTP packet. Another example of when it may be inappropriate for the gap detector module 110 to request that an RTP packet be retransmitted from the server is when that retransmission request is premature, in the sense that the missing data packet is not in fact lost but merely slightly delayed relative to other received RTP packets of nearby sequence number. Once the gap detector module 110 has determined which missing RTP packets truly merit being requested to be retransmitted, the request for retransmission of the missing RTP packets by sequence number may be transmitted to the server 101 at 804. The gap detector module 110 may then repeat this cycle of processing recommencing at 801.

Figure 9:
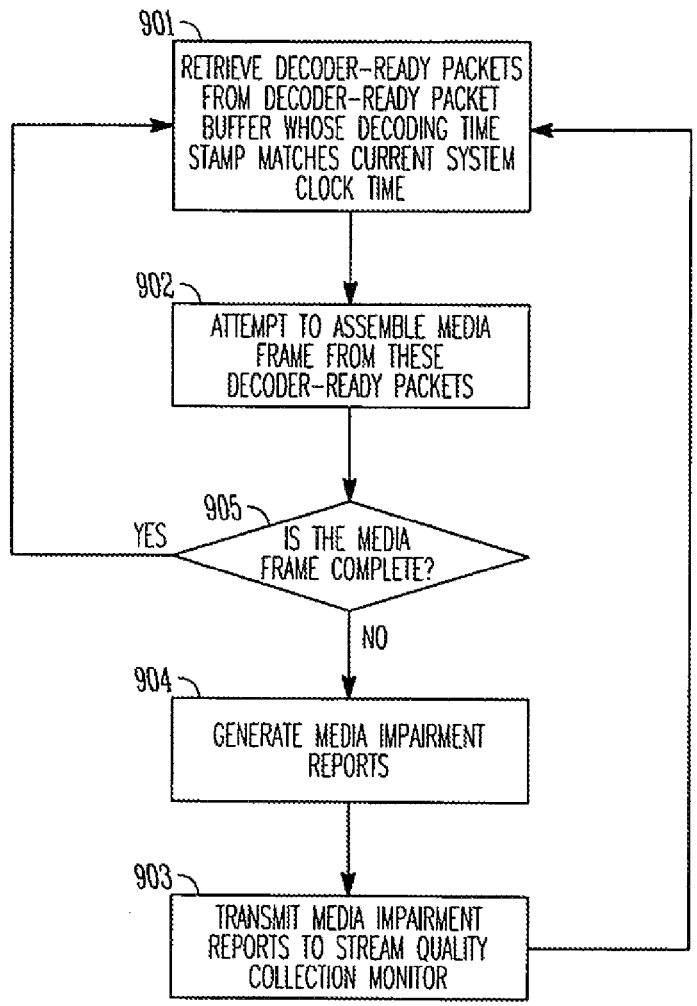
FIG. 9 shows a summary flow chart for the operation of a virtual media player module, in particular the generation and transmission of media impairment reports, according to an example embodiment.

FIG. 9 shows a summary flow chart for the operation of a virtual media player module 112, in particular the preparation of media impairment reports, according to an example embodiment. At 901, a virtual media player (such as, for example, a virtual video player, virtual audio player, or the like) module 112 retrieves decoder-ready packets from the buffer III whose decoding timestamp (which may be the time at which a decoder-ready packet should be decoded for timely presentation of its content within a media presentation to a user) approximates the current system clock time. In some embodiments, these decoder ready packets that are retrieved at 901 may include partial decoder-ready packets if the media decoder module 108 can also process these, as elaborated elsewhere in this specification. It will be appreciated that simultaneously, a media decoder module 108 may retrieve or process copies of these same decoder-ready packets from its buffer 107. At 902, the virtual media player may attempt to assemble one of more media frames or other discrete portion of the media stream from the decoder-ready packets retrieved at 901. At 905, these media frames may be examined and the virtual media player module 112 determines whether they constitute complete media frames. If the result of these examinations is found to be positive, no media impairment report needs to be sent to the stream quality collection monitor 103 with respect to these frames and processing of the next section of the decoder-ready packet encapsulated media stream continues at 901. In some embodiments, actual media frames are not constructed, but instead, the processing carried out at 902 and 905 is replaced by a process to determine whether the retrieved decoder-ready packets provide enough data for the construction of complete media frames.

If the virtual media player module 112 determines that the media frames that were attempted to be assembled at 902 are in some way impaired or ill-formed as encapsulated by the decoder-ready packets retrieved at 901, processing may continue at 904 to generate various types of media impairment reports, depending on the format of the decoder-ready packets and the kind of media being analyzed. These media impairment reports may be transmitted (in some embodiments, aggregated with other such reports) at 903 to the stream quality collection monitor 103. In some embodiments, the level of media impairment as described by these reports, may need to be above a predefined threshold for it to be transmitted to stream quality collection monitor 103. In some embodiments, the transmitting in 903 may occur before processing continues back to 901, or may occur in parallel. The virtual media player module 112 may then continue to process further decoder-ready packets to determine media performance in synchrony with the media decoder module 108 including repeating the processing at 901 et seq.

A number of techniques may be used, such as at block 904, to generate media impairment information, such as video presentation performance information and subscriber video presentation quality information. Some examples of these techniques include V-Sector, the moving picture quality metric (MPQM), peak signal-to-noise ratio (PSNR), the media delivery index (MDI), and various other video quality metrics.

The implementation of the media decoder module 108, in terms of its ability to handle partial or defective decoder-ready packets, such as PES packets in the case of MPEG video, may influence the choice of implementation of the corresponding virtual media player module 112. For example, suppose that in the process of transmitting a media stream from a server 101, a number of data packets are lost, resulting in a number of decoder-ready packets otherwise extractable from the data packet stream if it had been received perfectly without loss, being in fact extracted in only partial form. In some embodiments, a system 114, such as, for example, a set-top box, includes a media decoder module 108 that is unable to process partial decoder-ready packets. In those embodiments, the system may be implemented in which only complete decoder-ready packets are stored into the decoder-ready packet buffers 107 and 111, and a corresponding virtual media player module 112 may be included in the system that reports on the media impairment perceived by the user after decoding by the media decoder module 108 that cannot process partial decoder-ready packets and its display by the media player module 109.

On the other hand, in other embodiments a system 114 may include a media decoder module 108 that can process certain kinds of partial decoder-ready packets. These latter embodiments, the data packet extractor module 106 may in fact store such partial decoder-ready packets into the buffers 107 and 111, and the virtual media player 112 in such a system may generate media impairment reports that take into account the effect on the user's perceived media quality of the ability of the media decoder module 108 to decode partial decoder-ready packets. It will be appreciated that analogous choices in the design and implementation of virtual media players to reflect the corresponding fault tolerance characteristics of their companion media decoder modules applies to many media stream types such as MPEG, MPEG-4, video formats other than MPEG, audio streams, and other media types.

Figure 10:
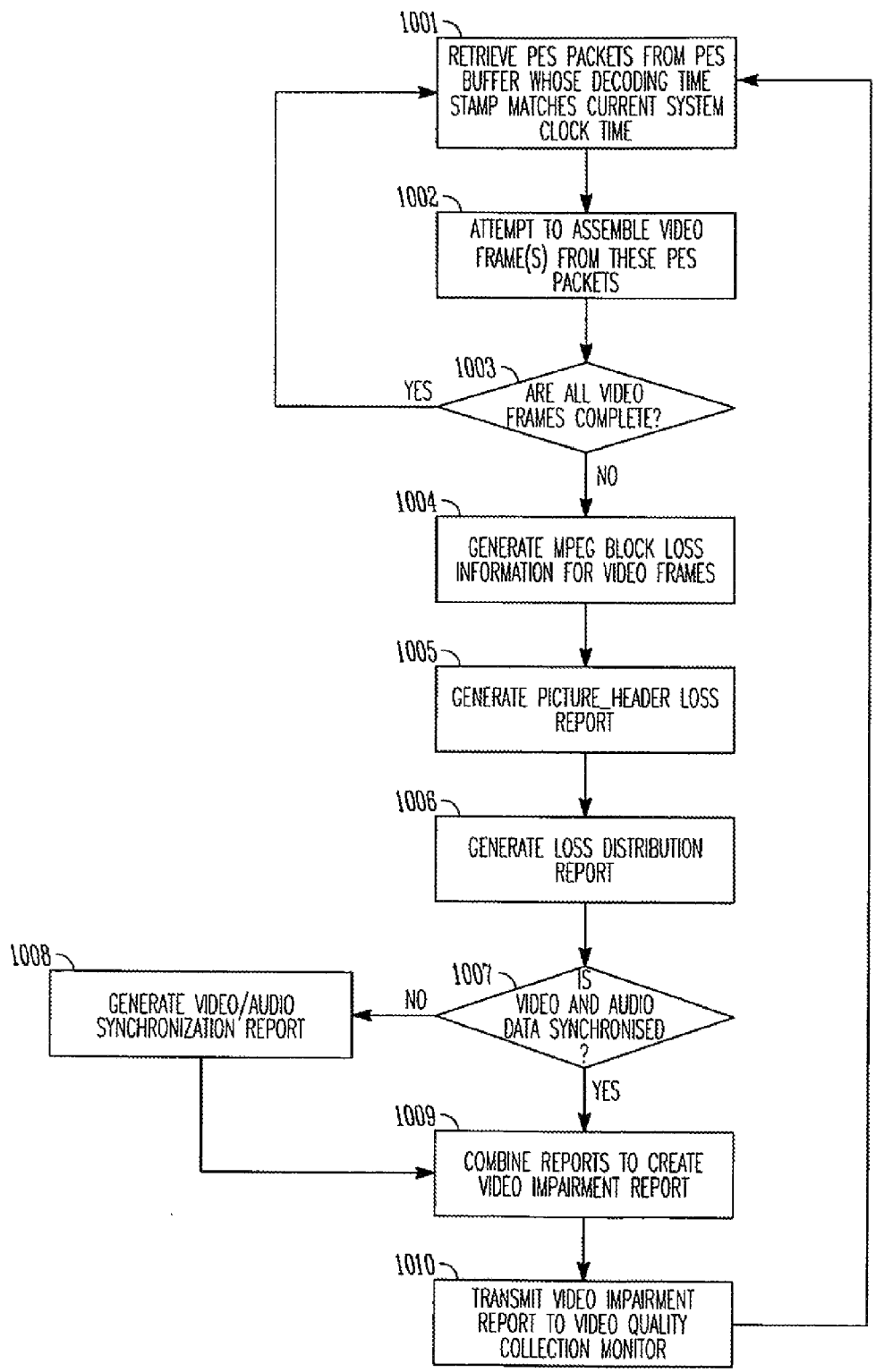
FIG. 10 shows a summary flow chart for the operation of a virtual media player module, in particular the generation and transmission of video impairment reports as relates to MPEG streams, according to an example embodiment.

FIG. 10 shows a summary flow chart for the operation of a virtual media player module 112, in particular the preparation of video impairment reports in the context of MPEG video stream processing, according to an example embodiment. As in some other summary flowchart figures, this flowchart shows an embodiment of a process as it may be implemented to handle MPEG video streams transmitted from a server 101 encapsulated in RTP packets. At 1001, a virtual media player (e.g., virtual video player) module 112 retrieves PES packets from the buffer 111 whose decoding timestamp (which may be the time at which a PES packet should be decoded for timely presentation of its content within a video presentation to a user) approximates the current system clock time. In some embodiments, these PES packets that are retrieved at 1001 may include partial PES packets if the media decoder module 108 can also process these, as elaborated elsewhere in this specification. It will be appreciated that simultaneously, a media decoder module 108 may retrieve or process copies of these same PES packets from its buffer 107. At 1002, the virtual media player module 112 may attempt to assemble one of more video frames from the PES packets retrieved at 1001. At 1003, these video frames may be examined and the virtual media player module 112 determines whether they constitute complete video frames and, in some embodiments, whether their associated audio is properly synchronized. If the result of these examinations is found to be positive, no video impairment report needs to be sent to the stream (e.g. video) quality collection monitor 103 with respect to these frames and processing of the next section of the PES packet encapsulated video stream continues at 1001. In some embodiments, actual video frames are not constructed, but instead, the processing carried out at 1002 and 1003 is replaced by a process to determine whether the retrieved PES packets provide enough data (e.g., in terms of picture headers, blocks, and the like) for the construction of complete MPEG frames.

If the virtual media player module 112 determines that the video frames are missing, incomplete, or ill-synchronized to their audio as encapsulated by the PES packets retrieved at 1001, processing may continue to generate various data sets for inclusion in a video impairment report to be sent to the stream quality collection monitor 103, in this case, a video quality collection module.

At 1004, the virtual media player module 112 may generate an MPEG block loss information report for the various video frames encapsulated in the PES packets retrieved in 1001, in some embodiments this may-be done by counting the number of lost blocks in each frame. In some embodiments, the virtual media player module 112 may, as part of the function at 1004, be able to analyze the retrieved PES packets, or the frames constructed from them, to determine the amount of video freezing, jerkiness, macro-blocking, and other impairments in the video as it may be presented by the media player module 109, and include the results of such analysis in the report generated at 1004, or as a separate report.

At 1005 a picture_header loss report may be generated for various video frames, this resulting report including, in some embodiments, loss information pertaining to entire video frames, and the distribution of entire frame loss by MPEG frame type (1, P, and B). Such information may be obtained, in some embodiments, by counting the various loss components and determining their distribution.

At 1006, a block loss and picture_header loss distribution report may be generated for the various frames, which may in some embodiments include information on other forms on content-level loss. These losses may, similarly, be determined by counting lost block and lost picture_headers in various frames and determining distributions relative to expected counts.

At 1007, the video and audio synchronization between the video frames encapsulated in the PES packets retrieved at 1001 is examined and if found to be faulty, a video/audio synchronization report may be generated at 1008. Video and audio synchronization may, in some embodiments, be obtained by counting asynchronization events.

At 1009, an aggregate or combined video impairment may be produced from the various reports produced at 1004-1006 and 1008, the various reports being, in some embodiments, further categorized to break out the various video impairments in terms of their relative distribution among I, P, and B MPEG frame types. This combined report, may be transmitted (in some embodiments, aggregated with other such combined reports) at 1010 to the stream quality collection monitor 103. In some embodiments, however, this aggregate report, or some of its constituent video impairment information, may need to be above a predefined threshold for it to be transmitted to stream quality collection monitor 103. In some embodiments, the transmitting at 1010 may occur before processing continues back to 1001, or may occur in parallel. The virtual media player module 112 may then continue to process further PES packets to determine video performance in synchrony with the media decoder module 108 including repeating the processing at 1001 et seq.

It will be appreciated that, in addition to the reports produced at 1004-1006 and 1008, the combined report may also include video impairment information, such as video presentation performance information or subscriber video presentation quality information, generated using such techniques as are described with respect to 904 of FIG. 9.

The implementation of the media decoder module 108, in terms of its ability to handle partial or defective PES packets in the case of MPEG video, may influence the choice of implementation of the corresponding virtual media player module 112. For example, suppose that in the process of transmitting an MPEG video or other media stream from a server 101, a number of RTP packets are lost, resulting in a number of PES packets otherwise extractable from the RTP stream if it had been received perfectly without loss, being in fact extracted in only partial form. In some embodiments, a system 114, such as, for example, a set-top box, includes a media decoder module 108 that is unable to process partial PES packets (such as PES packets where the header data is present but other data further along in the PES data structure is missing or corrupted). In such embodiments, the system may be implemented in which only complete PES packets are stored into the decoder-ready packet buffers 107 and 111, and a corresponding virtual media player module 112 may be included in the system that reports on the video impairment perceived by the user after decoding by the media decoder module 108 that cannot process partial PES packets and its display by the media player module 109.

On the other hand, in other embodiments a system 114 may include a media decoder module 108 that can process certain kinds of partial PES packets, (such as those containing at least header information, or merely a block's worth of data such as an 8×8 or 16×16 and no header, in MPEG-4). In such embodiments, the data packet extractor module 106 may in fact store such partial PES packets into the buffers 107 and 111, and the virtual media player 112 in such a system may generate video impairment reports that take into account the effect on the user's perceived video quality of the ability of the media decoder module 108 to decode partial PES packets. It will be appreciated that analogous choices in the design and implementation of virtual media players to reflect the corresponding fault tolerance characteristics of their companion media decoder modules extends to other media stream types such as other video formats besides MPEG, audio streams, and other media types.

Figure 11:
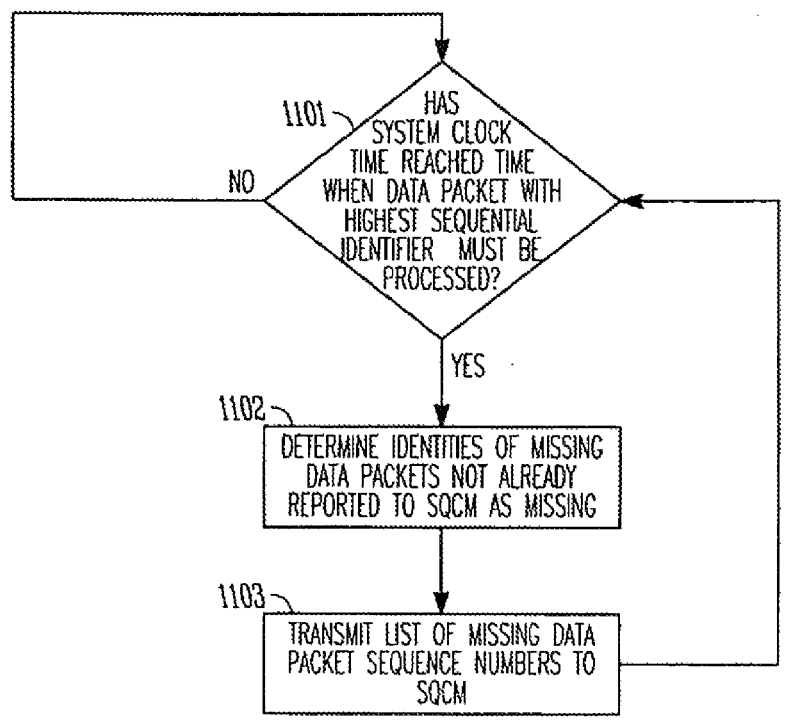
FIG. 11 shows a summary flow chart for the operation of a virtual media player module, in particular the generation of data packet loss reports, according to a further example embodiment.

FIG. 11 shows a summary flow chart for the operation of a virtual media player module 112, in particular the preparation of data packet loss reports, according to an example embodiment. To generate a data packet loss report, the virtual media player module 112 may at 1101 monitor the content of the data packet buffer 105, waiting for the system clock time to advance to the point that the data packet with the highest sequential identifier (the "current data packet") is to be processed in order for its content to be properly decoded and presented to the user. When this condition occurs, the virtual media player module 112 (at 1102) may examine the data packet buffer 105 to determine a list of data packet identifiers that correspond to data packets that are missing in the sense that they would have been expected based on the presence of gaps in sequence-indicating data within data packets actually found in the data packet buffer 105. Thus, it will be appreciated that data packets whose decoding time has already passed may need to be stored in the data packet buffer 105 to facilitate operation 1102, since it is data packets absent from the data packet buffer 105 that should have been processed between the "current data packet" and another, timely received data packet that was processed before the "current data packet" that may be deemed as missing. Once the list of missing data packet sequence numbers has been determined at 1202, the virtual media player may at 1103 transmit this list (minus the identification of previously reported missing data packets) to the stream quality collection monitor 103 as a data packet loss report, with processing then looping back and continuing at 1101.

Figure 12:
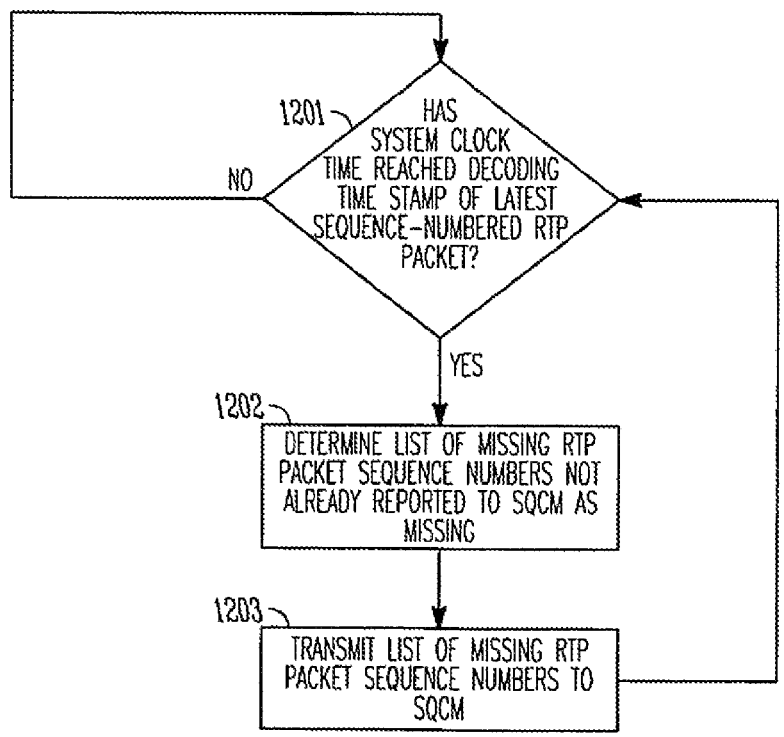
FIG. 12 shows a summary flow chart for the operation of a virtual media player module, in particular the generation of data packet loss reports in which data packets may be RTP packets, according to an example embodiment.

FIG. 12 shows a summary flow chart for the operation of a virtual media player module 112, in particular the preparation of data packet loss reports, such as RTP packet loss reports, according to an example embodiment. To generate a data packet loss report, the virtual media player module 112 may at 1201 monitor the content of the data packet buffer 105 waiting for the system clock time to advance to coincide with the decoding time stamp of the RTP packet (in the case e.g. of an MPEG stream encapsulated in a series of RTP packets) with the highest (e.g. latest) sequence number in the data packet buffer 105, which for reference may be called "data packet X". When this condition occurs, the virtual media player module 112 (at 1202) may examine the data packet buffer 105 to determine a list of RTP packet sequence numbers that correspond to RTP packets that are missing (e.g., missing from the data packet buffer 105 and of lower sequence number than "data packet X") and that have not already been reported to the stream quality collection monitor 103 as missing. It will be appreciated that RTP packets whose decoding time has already passed may need to be stored in the data packet buffer 105 to facilitate operation 1202, since it is data packets absent from the data packet buffer 105 whose sequence numbers lie between that of data packet X' and that of another, timely received data packet whose decoding timestamp is somewhat earlier than the decoding time stamp of 'data packet X' that may be reported as missing. Once the list of missing data packet sequence numbers has been determined at 1202, the virtual media player may at 1203 transmit this list to the stream quality collection monitor 103 as an RTP packet loss report. Processing then loops back and continues at 1201.

It will be appreciated that the decoding time stamp of a data packet is separate and generally earlier than the decoding time stamp of decoder-ready packets that may be encapsulated within one or more data packets. It will be further appreciated that loss distance and loss rate information may be included in data packet loss reports as well as the identity and number of actual lost or missing data packets.

Figure 13:
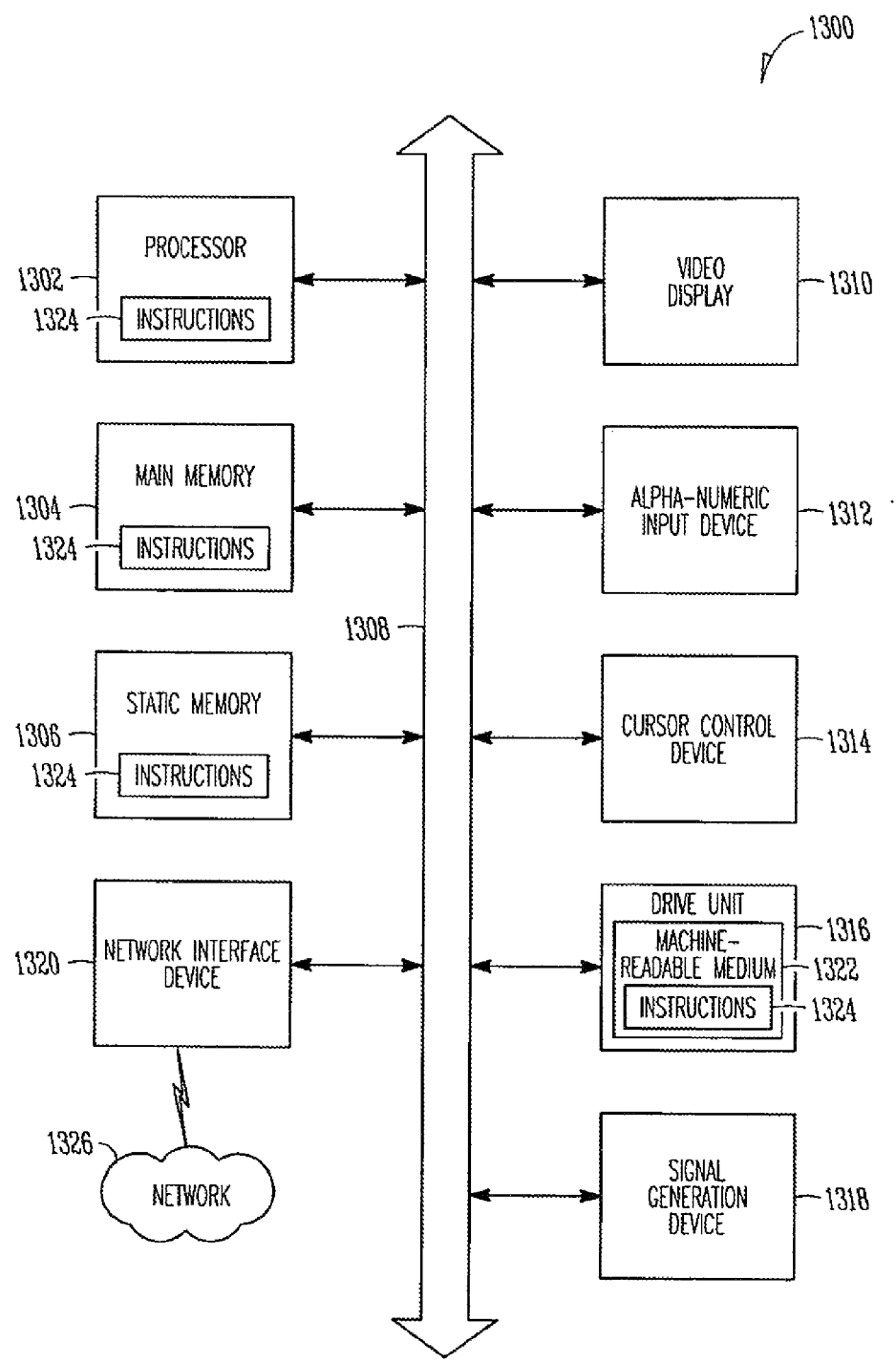
FIG. 13 shows a diagrammatic representation of machine in the example form of a computer system within which instructions, for causing the machine to perform anyone or more of the methodologies discussed herein, may be executed.

FIG. 13 shows a diagrammatic representation of machine in the example form of a computer system 1300 within which a set of instructions, for causing the machine to perform anyone or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform anyone or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (VI) navigation device 1314 (e.g., a mouse), a disk drive unit 1316, a signal generation device 1318 (e.g., a speaker) and a network interface device 1320.

The disk drive unit 1316 includes a machine-readable medium 1322 on which is stored one or more sets of instructions and data structures (e.g., software 1324) embodying or utilized by anyone or more of the methodologies or functions described herein. The software 1324 may also reside, completely or at least partially, within the main memory 1304 and/or within the processor 1302 during execution thereof by the computer system 1300, the main memory 1304 and the processor 1302 also constituting machine-readable media.

The software 1324 may further be transmitted or received over a network 1326 via the network interface device 1320 utilizing anyone of a number of well-known transfer protocols (e.g., HTTP).

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform anyone or more of the methodologies of the present invention, or that is capable of storing, or encoding data structures utilized by or associated with such a set of instructions. The term "machine-readable medium" shall accordingly be taken to include, but not be limited to, solid-state memories, optical and magnetic media.

Figure 14:
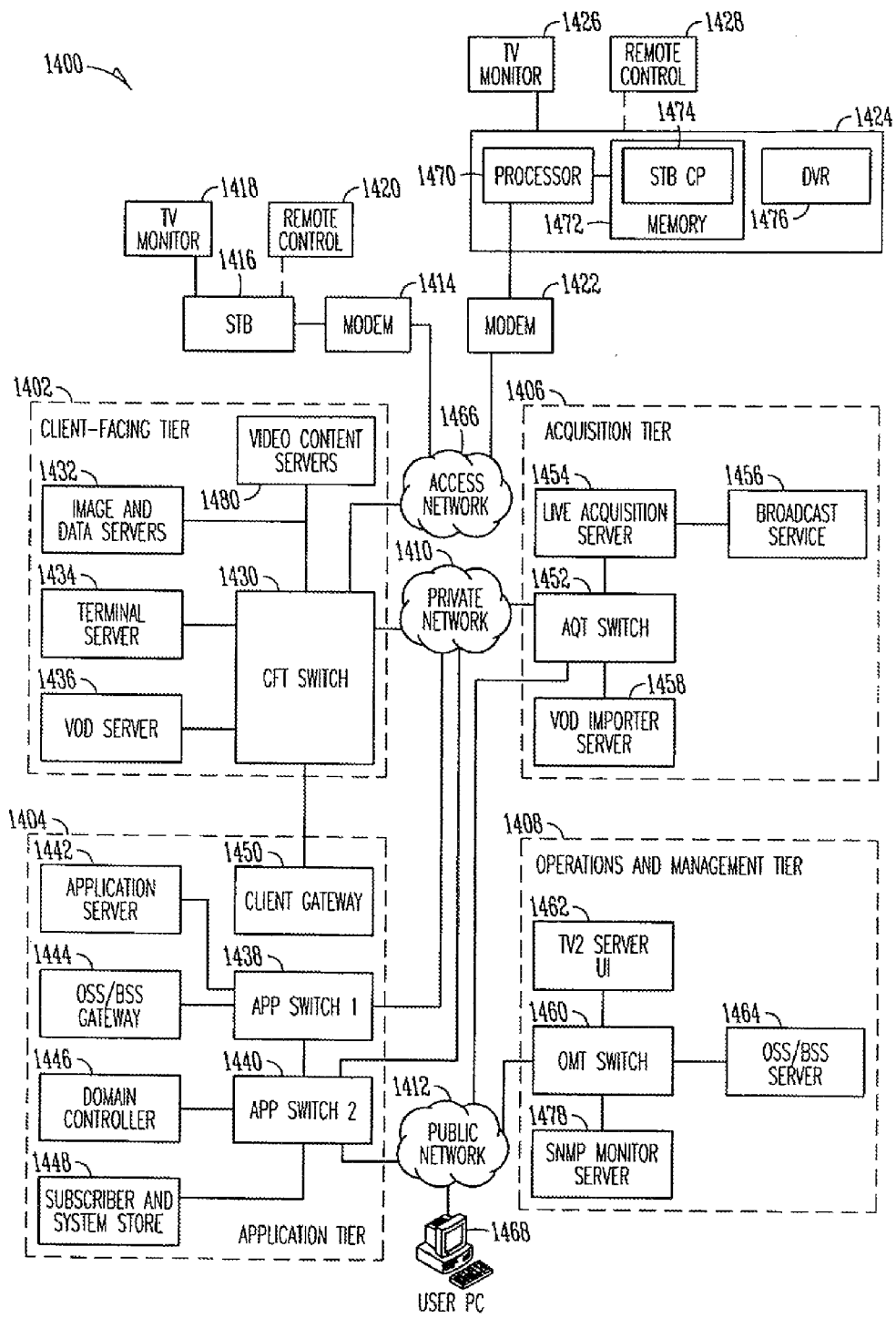
FIG. 14 shows a diagrammatic representation of an Internet Protocol Television (IPTV) system that may be used to provide video content, according to an example embodiment.

In some embodiments, the computer system 1300 may be included within a set-top box device, IP media receiver, IP video receiver, or other device and may be configured to carry out the processes described herein. Referring to FIG. 14, an illustrative embodiment of an Internet Protocol Television (IPTV) system that may be used to provide video content is illustrated and is generally designated 1400. As shown, the system 1400 can include a client facing tier 1402, an application tier 1404, an acquisition tier 1406, and an operations and management tier 1408. Each tier 1402, 1404, 1406, 1408 is coupled to a private network 1410; to a public network 1412, such as the Internet; or to both the private network 1410 and the public network 1412. For example, the client-facing tier 1402 can be coupled to the private network 1410. Further, the application tier 1404 can be coupled to the private network 1410 and to the public network 1412. The acquisition tier 1406 can also be coupled to the private network 1410 and to the public network 1412. Additionally, the operations and management tier 1408 can be coupled to the public network 1412.

As illustrated in FIG. 14, the various tiers 1402, 1404, 1406, 1408 communicate with each other via the private network 1410 and the public network 1412. For instance, the client-facing tier 1402 can communicate with the application tier 1404 and the acquisition tier 1406 via the private network 1410. The application tier 1404 can also communicate with the acquisition tier 1406 via the private network 1410. Further, the application tier 1404 can communicate with the acquisition tier 1406 and the operations and management tier 1408 via the public network 1412. Moreover, the acquisition tier 1406 can communicate with the operations and management tier 1408 via the public network 1412. In a particular embodiment, elements of the application tier 1404, including, but not limited to, a client gateway 1450, can communicate directly with the client-facing tier 1402.

As illustrated in FIG. 14, the client-facing tier 1402 can communicate with user equipment via a private access network 1466, such as an Internet Protocol Television (IPTV) access network. In an illustrative embodiment, modems, such as a first modem 1414 and a second modem 1422 can be coupled to the private access network 1466. The client-facing tier 1402 can communicate with a first representative set-top box device 1416 via the first modem 1414 and with a second representative set-top box device 1424 via the second modem 1422. The client facing tier 1402 can communicate with a large number of set-top boxes, such as the representative set-top boxes 1416, 1424, over a wide geographic area, such as a regional area, a metropolitan area, a viewing area, a designated market area or any other suitable geographic area, market area, or subscriber or customer group that can be supported by networking the client-facing tier 1402 to numerous set-top box devices. In an illustrative embodiment, the client-facing tier, or any portion thereof, can be included at a video head-end office.

In a particular embodiment, the client-facing tier 1402 can be coupled to the modems 1414, 1422 via fiber optic cables. Alternatively, the modems 1414 and 1422 can be digital subscriber line (DSL) modems that are coupled to one or more network nodes via twisted pairs, and the client-facing tier 1402 can be coupled to the network nodes via fiber-optic cables. Each set-top box device 1416, 1424 can process data received via the private access network 1466, via an IPTV software platform, such as Microsoft® TV IPTV Edition.

Additionally, the first set-top box device 1416 can be coupled to a first external display device, such as a first television monitor 1418, and the second set-top box device 1424 can be coupled to a second external display device, such as a second television monitor 1426. Moreover, the first set-top box device 1416 can communicate with a first remote control 1420, and the second set-top box device can communicate with a second remote control 1428.

In an exemplary, non-limiting embodiment, each set-top box device 1416, 1424 can receive video content, which may include video and audio portions, from the client-facing tier 1402 via the private access network 1466. The set-top boxes 1416, 1424 can transmit the video content to an external display device, such as the television monitors 1418, 1426. Further, the set-top box devices 1416, 1424 can each include a STB processor, such as STB processor 1470, and a STB memory device, such as STB memory 1472, which is accessible to the STB processor 1470. In one embodiment, a computer program, such as the STB computer program 1474, can be embedded within the STB memory device 1472. Each set-top box device 1416, 1424 can also include a video content storage module, such as a digital video recorder (DVR) 1476. In a particular embodiment, the set-top box devices 1416, 1424 can communicate commands received from the remote control devices 1420, 1428 to the client-facing tier 1402 via the private access network 1466.

In an illustrative embodiment, the client-facing tier 1402 can include a client-facing tier (eFT) switch 1430 that manages communication between the client-facing tier 1402 and the private access network 1466 and between the client facing tier 1402 and the private network 1410. As shown, the eFT switch 1430 is coupled to one or more image and data servers 1432 that store still images associated with programs of various IPTV channels. The image and data servers 1432 can also store data related to various channels, e.g., types of data related to the channels and to programs or video content displayed via the channels. In an illustrative embodiment, the image and data servers 1432 can be a cluster of servers, each of which can store still images, channel and program-related data, or any combination thereof. The eFT switch 1430 can also be coupled to a terminal server 1434 that provides terminal devices with a connection point to the private network 1410. In a particular embodiment, the eFT switch 1430 can also be coupled to a video-on-demand (VOD) server 1436 that stores or provides VOD content imported by the IPTV system 1400. The client-facing tier 1402 can also include one or more video content servers 1480 that transmit video content requested by viewers via their set-top boxes 1416, 1424. In an illustrative, non-limiting embodiment, the video content servers 1480 can include one or more multicast servers.

As illustrated in FIG. 14, the application tier 1404 can communicate with both the private network 1410 and the public network 1412. The application tier 1404 can include a first application tier (APP) switch 1438 and a second APP switch 1440. In a particular embodiment, the first APP switch 1438 can be coupled to the second APP switch 1440. The first APP switch 1438 can be coupled to an application server 1442 and to an OSS/BSS gateway 1444. In a particular embodiment, the application server 1442 can provide applications to the set-top box devices 1416, 1424 via the private access network 1466, which enable the set-top box devices 1416, 1424 to provide functions, such as display, messaging, processing of IPTV data and VOD material, etc. In a particular embodiment, the OSS/BSS gateway 1444 includes operation systems and support (OSS) data, as well as billing systems and support (BSS) data. In one embodiment, the OSS/BSS gateway can provide or restrict access to an OSS/BSS server 1464 that stores operations and billing systems data.

Further, the second APP switch 1440 can be coupled to a domain controller 1446 that provides web access, for example, to users via the public network 1412. For example, the domain controller 1446 can provide remote web access to IPTV account information via the public network 1412, which users can access using their personal computers 1468. The second APP switch 1440 can be coupled to a subscriber and system store 1448 that includes account information, such as account information that is associated with users who access the system 1400 via the private network 1410 or the public network 1412. In a particular embodiment, the application tier 1404 can also include a client gateway 1450 that communicates data directly with the client-facing tier 1402. In this embodiment, the client gateway 1450 can be coupled directly to the eFT switch 1430. The client gateway 1450 can provide user access to the private network 1410 and the tiers coupled thereto.

In a particular embodiment, the set-top box devices 1416, 1424 can access the IPTV system 1400 via the private access network 1466, using information received from the client gateway 1450. In this embodiment, the private access network 1466 can provide security for the private network 1410. User devices can access the client gateway 1450 via the private access network 1466, and the client gateway 1450 can allow such devices to access the private network 1410 once the devices are authenticated or verified. Similarly, the client gateway 1450 can prevent unauthorized devices, such as hacker computers or stolen set-top box devices from accessing the private network 1410, by denying access to these devices beyond the private access network 1466.

For example, when the first representative set-top box device 1416 accesses the system 1400 via the private access network 1466, the client gateway 1450 can verify subscriber information by communicating with the subscriber and system store 1448 via the private network 1410, the first APP switch 1438, and the second APP switch 1440. Further, the client gateway 1450 can verify billing information and status by communicating with the OSS/BSS gateway 1444 via the private network 1410 and the first APP switch 1438. In one embodiment, the OSS/BSS gateway 1444 can transmit a query across the first APP switch 1438, to the second APP switch 1440, and the second APP switch 1440 can communicate the query across the public network 1412 to the OSS/BSS server 1464. After the client gateway 1450 confirms subscriber and/or billing information, the client gateway 1450 can allow the set-top box device 1416 access to IPTV content and VOD content. If the client gateway 1450 cannot verify subscriber information for the set top box device 1416, e.g., because it is connected to an unauthorized twisted pair, the client gateway 1450 can block transmissions to and from the set-top box device 1416 beyond the private access network 1466.

As indicated in FIG. 14, the acquisition tier 1406 includes an acquisition tier (AQT) switch 1452 that communicates with the private network 1410. The AQT switch 1452 can also communicate with the operations and management tier 1408 via the public network 1412. In a particular embodiment, the AQT switch 1452 can be coupled to a live acquisition server 1454 that receives television or movie content, for example, from a broadcast service 1456. In a particular embodiment during operation of the IPTV system, the live acquisition server 1454 can acquire television or movie content. The live acquisition server 1454 can transmit the television or movie content to the AQT switch 1452, and the AQT switch 1452 can transmit the television or movie content to the eFT switch 1430 via the private network 1410.

Further, the television or movie content can be transmitted to the video content servers 1480, where it can be encoded, formatted, stored, or otherwise manipulated and prepared for communication to the set-top box devices 1416, 1424. The eFT switch 1430 can communicate the television or movie content to the modems 1414, 1422 via the private access network 1466. The set-top box devices 1416, 1424 can receive the television or movie content via the modems 1414, 1422, and can transmit the television or movie content to the television monitors 1418, 1426. In an illustrative embodiment, video or audio portions of the television or movie content can be streamed to the set-top box devices 1416, 1424.

Further, the AQT switch can be coupled to a video-on-demand importer server 1458 that stores television or movie content received at the acquisition tier 1406 and communicates the stored content to the VOD server 1436 at the client-facing tier 1402 via the private network 1410. Additionally, at the acquisition tier 1406, the video-on-demand (VOD) importer server 1458 can receive content from one or more VOD sources outside the IPTV system 1400, such as movie studios and programmers of non-live content. The VOD importer server 1458 can transmit the VOD content to the AQT switch 1452, and the AQT switch 1452, in turn, can communicate the material to the eFT switch 1430 via the private network 1410. The VOD content can be stored at one or more servers, such as the VOD server 1436.

When users issue requests for VOD content via the set-top box devices 1416, 1424, the requests can be transmitted over the private access network 1466 to the VOD server 1436, via the eFT switch 1430. Upon receiving such requests, the VOD server 1436 can retrieve the requested VOD content and transmit the content to the set-top box devices 1416, 1424 across the private access network 1466, via the eFT switch 1430. The set-top box devices 1416, 1424 can transmit the VOD content to the television monitors 1418, 1426. In an illustrative embodiment, video or audio portions of VOD content can be streamed to the set-top box devices 1416, 1424.

FIG. 14 further illustrates that the operations and management tier 1408 can include an operations and management tier (OMT) switch 1460 that conducts communication between the operations and management tier 1408 and the public network 1412. In the embodiment illustrated by FIG. 14, the OMT switch 1460 is coupled to a TV2 server 1462. Additionally, the OMT switch 1460 can be coupled to an OSS/BSS server 1464 and to a simple network management protocol (SNMP) monitor 1470 that monitors network devices within or coupled to the IPTV system 1400. In a particular embodiment, the OMT switch 1460 can communicate with the AQT switch 1452 via the public network 1412.

In an illustrative embodiment, the live acquisition server 1454 can transmit the television or movie content to the AQT switch 1452, and the AQT switch 1452, in turn, can transmit the television or movie content to the OMT switch 1460 via the public network 1412. In this embodiment, the OMT switch 1460 can transmit the television or movie content to the TV2 server 1462 for display to users accessing the user interface at the TV2 server 1462. For example, a user can access the TV2 server 1462 using a personal computer (PC) 1468 coupled to the public network 1412.

In some embodiments, a modem 1422 may be included as a component of a set-top box 1424, and in some further embodiments, may be a separate component. For the purposes of this specification, the set-top box devices 1416 and 1424 and personal computer (PC) 1468 may all be considered examples of IP video receivers. In some embodiments, video content, which may include video and audio portions, may be transmitted from the client-facing tier 1402 in the form of data packets; in some embodiments these data packets may be RTP packets.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   a computer system receiving, from a media source, data packets including data of a media stream to be displayed;
   the computer system buffering the data packets, wherein the buffered data packets are usable to produce a decoded version of the media stream for display by the computer system;
   the computer system analyzing the header information in the buffered data packets to generate delivery performance information, wherein the analyzing is performed without fully decoding the buffered data packets;

and the computer system providing a report to the media source, wherein the provided report includes the generated delivery performance information.

2. The method of claim 1, wherein the computer system buffering the data packets comprises the computer system buffering the data packets within a first buffer and a second buffer, wherein the buffered data packets within the first buffer are usable to display the media stream, and wherein the buffered data packets within the second buffer are usable for the analyzing.

3. The method of claim 1, wherein the analyzing includes a determination of whether the buffered data packets are usable to construct complete media frames.

4. The method of claim 1, wherein the delivery performance information identifies a packet loss rate for the data packets.

5. The method of claim 1, wherein the data packets are real-time protocol (RTP) packets.

6. The method of claim 1, wherein the data packets include moving picture experts group (MPEG) frame data.

7. The method of claim 6, wherein the delivery performance information includes an indication of I-frame, P-frame, and B-frame loss.

8. A method comprising:

a source transmitting, to a computer system, data packets that include data of a media stream to be displayed;

the source receiving, from the computer system, performance information based at least in part on an analysis of header information in the data packets, wherein the analysis is performed without fully decoding the data packets, and wherein the data packets are buffered to be usable to produce a decoded version of the media stream for display by the computer system.

9. The method of claim 8, wherein the analysis is performed in part based on determining whether the buffered data packets are usable to assemble complete media frames, and wherein the received performance information identifies a number of missing media frames.

10. The method of claim 8, wherein the media stream includes one or more decoder-ready packets.

11. The method of claim 8, wherein the performance information specifies an indication of packet header loss associated with the media stream.

12. The method of claim 8, wherein the transmitted media stream includes real-time protocol packets.

13. The method of claim 8, wherein the performance information includes an indication of I-frame, P-frame, and B-frame loss.

14. A non-transitory computer-readable storage medium having program instructions stored therein which, when executed by a computer system, cause the computer system to perform operations comprising:

receiving data packets that include data of a media stream via a network from a source;

storing the data packets, wherein the stored data packets are usable to produce a decoded version of the media stream for display;

analyzing header information in the stored data packets to generate report specifying delivery performance information, wherein the analyzing is performed without fully decoding the stored data packets; and transmitting the report to the source.

15. The non-transitory computer-readable storage medium of claim 14, wherein the operations further comprise fully decoding the stored data packets to produce a decoded version of the media stream for display.

16. The non-transitory computer-readable storage medium of claim 14, wherein the report to the source includes moving picture experts group (MPEG) block loss information or MPEG picture header loss information.

17. The non-transitory computer-readable storage medium of claim 14, wherein the report to the source includes network delivery path performance information.

18. The non-transitory computer-readable storage medium of claim 14, wherein the report to the source includes data packet loss information.

19. The non-transitory computer-readable storage medium of claim 14, wherein the report to the source includes video and audio synchronization information.

20. The non-transitory computer-readable storage medium of claim 14, wherein the operations further comprise analyzing whether the stored data packets are usable to assemble complete media frames.

* * * * *